Aug. 29, 1967     A. CAUVIN     3,338,620
VEHICLES AND FITTING THEREFOR
Filed Dec. 30, 1964
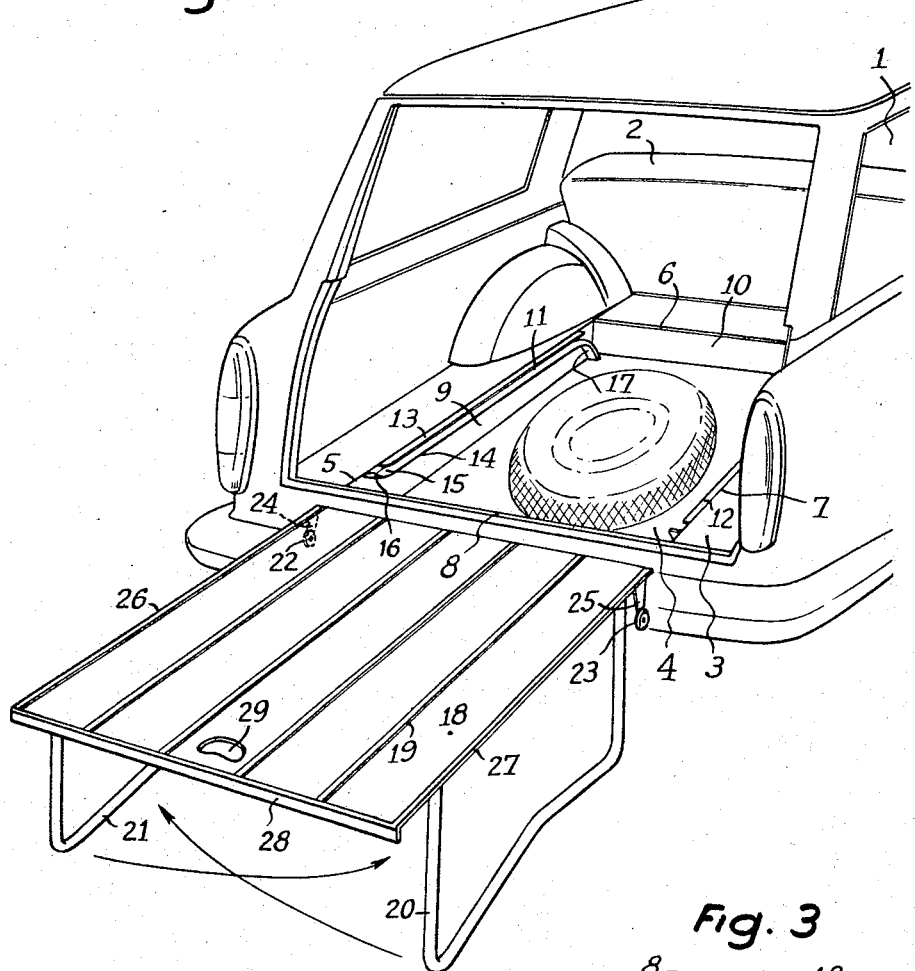
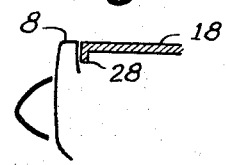
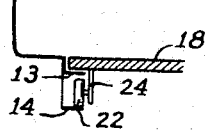
Inventor
André Cauvin
By Stevens, Davis, Miller & Mosher
Attorneys

United States Patent Office 3,338,620
Patented Aug. 29, 1967

3,338,620
VEHICLES AND FITTING THEREFOR
André Cauvin, Port-Marly, France, assignor to Société Anonyme Simca Automobiles, Paris, France
Filed Dec. 30, 1964, Ser. No. 422,220
Claims priority, application France, Jan. 6, 1964, 959,397
5 Claims. (Cl. 296—37)

The present invention relates to vehicles, and specifically to a table fitting for a vehicle, particularly a motor vehicle which may advantageously be of the kind known as an Estate Car or Shooting Brake and hereinafter referred to as an Estate Car. These Estate Cars have a very large rear compartment, to which access is had through a rear panel or door of the body, and the layout is such that they are particularly suitable for campers, since a large amount of luggage and equipment may be loaded into this compartment.

However, since camping material is voluminous in itself, it is always desirable to reduce the loaded bulk thereof as much as possible.

It is an object of the invention to provide a folding table, e.g. for camping, the top of which table is constituted by a part of the floor of the rear compartment of a vehicle. In this way, a table may be made available at any moment when the vehicle is not travelling, necessitating no additional space and which may have, without disadvantage, relatively large dimensions.

The invention consists in a vehicle having a rear compartment, part of the floor of which is movable from a position within the vehicle to a position outside the vehicle, said floor part having retractible legs to enable it to be used as a table.

In order that the invention may be more clearly understood, reference will now be made to the accompanying drawings which show one embodiment thereof by way of example, and in which:

FIGURE 1 shows a perspective view of the rear part of a vehicle,

FIGURE 2 shows a detail view of the assembly of the table top with respect to the floor of the rear compartment, and FIGURE 3 shows a detail view of the assembly of the table top against the rear edge of the body of the vehicle.

Referring to the drawings, FIGURE 1 shows an Estate Car motor vehicle having a rear compartment 1, located behind the front seat 2, which comprises a floor constituted by a fixed part 3, having, in its centre, an opening 4, preferably rectangular, defined by edges 5, 6, 7 of the part 3 and by an edge 8 of the rear door or panel.

From the edges 5, 6, 7 of the floor extend vertical walls, of which only the walls 9, 10 of the edges 5, 6 are visible in the drawing. The vertical opposed walls corresponding to the edges 5, 7 are provided with guide rails 11, 12. The rail 11 is constituted by an upper flat strip 13 secured against the wall 19 at the height of the fixed floor part 3 or a little below, and by a lower flat strip 14 secured to the wall 9 so as to form with the strip 13 a longitudinal groove 15. The lower strip 14 is extended at its two ends beyond the upper strip 13 by means of two ramps 16 and 17. The rail 12, partially shown in the drawing, is made in the same manner as rail 11.

A table constituted by a plate top 18, preferably made of sheet metal, and having reinforcing ribs 19 and retractible or foldable legs 20, 21, is provided with rollers 22, 23 fixed on two support brackets 24, 25 perpendicular to the wall of the top 18 and located at one of its ends on two opposed edges 26, 27.

The top 18 is dimensioned so that it may cover the opening 4 of the floor 3 by co-operation with the edges 5, 6, 7, 8 so as to be substantially continuous with the fixed part 3 of the floor (FIGURE 2). Thus, the table 18 forms part of the whole floor of the rear compartment when it is in position.

The edge 28 of the top 18 is bent over at 90° in order to form a stop strip for application against the internal wall of the edge 8 of the rear door or panel (FIGURE 3).

An opening 9 is provided in the top 18 so as to constitute a hand-hold enabling it to be put into position or to be removed from the vehicle.

It is put into position in the following manner.

After the legs 20, 21 (held by suitable brackets beneath the top) have been folded beneath the top 18, the rollers 22, 23 are introduced into the rails 11, 12. Only the rail 11 will be referred to, since it is the only one visible in the drawing, and the rail 12 is symmetrical with it. The rollers 22 passes into the groove 15 by following the slope 16 and, guided by the strips 13, 14 it enables the top 18 to be inserted into the rear compartment 1. When the roller 22 meets the slope 17, it causes the top 18 to begin a descending movement, so that the edges of said top come to rest on the strips 13, 14 of the floor 3 and whereby the edge 28 locates against the edge 8 of the rear door or panel (FIGURES 2, 3). When the top 18 is in position, the fixed part 3 and the top 18 exhibit a substantially continuous surface, forming a complete floor, wherein the rear compartment may be used in the usual way for loading purposes. Although in the shown example, the table is referred to as being used for camping, it is obvious that it could be used for other purposes such as picnics.

Moreover, although the specific description refers to an Estate Car, it will be apparent that the invention may be applied to the boot or trunk of an ordinary car, provided that the boot or trunk lid comes right down to the floor of the compartment. Moreover, although the top 18 is described as having a sliding engagement, it could be hinged to the rear part of the floor to hinge outwardly turning the top over in so doing. Of course, in such a case, the axial length of the table top must not exceed the height of the rear opening. In such an arrangement, the strengthening ribs 19 would be beneath the table top in its "table" position and the legs 20, 21 could be accommodated in parts cut out transversely in these ribs, for folding down when the table top is in its pack away position.

Thus, it will be apparent that various modifications may be made to the specific details set forth.

I claim:

1. A vehicle having a storage compartment terminating at one end thereof, and comprising a floor, a platform detachably on said vehicle and normally forming a portion of the floor of said compartment, roller means on said platform extending downwardly therefrom, and horizontally disposed guide means connected to the floor below the level thereof and cooperating with said roller means to permit said platform to be moved to and from a normal position and an extended position, at least one end portion of said guide means being sloped to permit said platform to clear said end of the vehicle during movement to and from said normal and extended positions.

2. The improvement of claim 1 further comprising at least one retractable support member carried by said platform to support said platform in said extended position.

3. The improvement of claim 1 wherein said roller means comprises at least one support bracket fixed to said platform, and a roller rotatably mounted on said support bracket.

4. The improvement of claim 3 wherein said guide means comprises at least one guide rail extending longitudinally with respect to said vehicle, said guide rail comprising an upper strip and a lower strip between which a corresponding roller extends.

5. The improvement of claim 4 wherein there are two guide rails secured to the fixed portion of said floor.

References Cited

UNITED STATES PATENTS

| | | | |
|---|---|---|---|
| 2,094,401 | 9/1937 | Girl | 214—65 |
| 2,160,958 | 6/1939 | Critchlow | 108—44 X |
| 2,797,828 | 7/1957 | Fritsche | 214—83.24 |
| 2,889,097 | 6/1959 | Broehl | 108—44 X |

BENJAMIN HERSH, *Primary Examiner.*

P. GOODMAN, *Assistant Examiner.*